INVENTOR
R. R. SCHULTZ
BY F. A. McCorkendale
ATTORNEY

Oct. 13, 1970 R. R. SCHULTZ 3,534,175

PRIVATE BRANCH EXCHANGE CONFERENCE CIRCUIT WITH RESTRICTION OF TRUNK CONNECTIONS

Filed June 26, 1967 5 Sheets-Sheet 2

LINE, LINK AND MARKER CIRCUIT

Oct. 13, 1970 R. R. SCHULTZ 3,534,175

PRIVATE BRANCH EXCHANGE CONFERENCE CIRCUIT WITH RESTRICTION OF TRUNK CONNECTIONS

Filed June 26, 1967 5 Sheets-Sheet 3

Oct. 13, 1970 R. R. SCHULTZ 3,534,175

PRIVATE BRANCH EXCHANGE CONFERENCE CIRCUIT WITH RESTRICTION OF TRUNK CONNECTIONS

Filed June 26, 1967 5 Sheets-Sheet 4

Oct. 13, 1970 R. R. SCHULTZ 3,534,175

PRIVATE BRANCH EXCHANGE CONFERENCE CIRCUIT WITH RESTRICTION OF TRUNK CONNECTIONS

Filed June 26, 1967 5 Sheets-Sheet 5

United States Patent Office 3,534,175

Patented Oct. 13, 1970

3,534,175

PRIVATE BRANCH EXCHANGE CONFERENCE CIRCUIT WITH RESTRICTION OF TRUNK CONNECTIONS

Ronald R. Schultz, Oak Park, Ill., assignor to Western Electric Company, Incorporated, New York, N.Y., a corporation of New York

Filed June 26, 1967, Ser. No. 648,778

Int. Cl. H04m *3/56, 3/60*

U.S. Cl. 179—18 10 Claims

ABSTRACT OF THE DISCLOSURE

A meet-me type conference circuit for use with a crossbar type PBX utilizes a common multiport transistorized conference amplifier. A plurality of extensions may be connected as conferees together with one, and only one, dial-repeating tie trunk and either (a) one, and only one, ringdown tie trunk or (b) one, and only one, central office trunk. Potential is supplied to various points in the circuit through a matrix of supervisory relay contacts on the basis of the number of the relays operated at the moment, and an arrangement of diodes is utilized to isolate the respective potential paths.

BACKGROUND OF THE INVENTION

In instances where a telephone customer, for example a business firm, a Government agency, or the like, requires a relatively large number of telephone extensions, it is the usual practice to provide on the premises, or conveniently located thereto, a private branch exchange commonly referred to as a PBX. The larger PBX's are usually served by one or more attendants from a console or attendant's position and function essentially as a small telephone central office in that intrastation calls between extensions on the premises are completed through the PBX as well as calls from the extensions to subscribers served through remote central offices and calls from such subscribers to extensions served by the PBX. A PBX of a type capable of serving a relatively large number of extensions and providing many advanced features is disclosed in Pat. 2,904,637, issued Sept. 15, 1959, to R. D. Williams.

It is fairly common practice to provide, in conjunction with the PBX, conference facilities by means of which several of the extension stations may be connected together in common for communication with each other and, on occasion, such a conference set-up may include outside parties connected via different types of trunks. For example, these conference circuit arrangements may be either of the customer controlled type wherein any one of the PBX extension users acts as the conference originator or controller, or of the "meet-me" type wherein all of the conferees acting in accordance with a prearranged plan dial the conference number at approximately the same previously-agreed-upon time. A customer controlled type of conference arrangement utilizing a common transistorized conference amplifier or conference bridge is disclosed in Pat. 3,322,901, issued May 30, 1967, to D. R. Trimmer, while a meet-me type of conference arrangement is disclosed in the Williams Pat. 2,904,637 referred to above. In addition, attendant controlled conference arrangements of different types are, of course, in common use.

While it is desirable for commercial reasons to permit the connection of outside parties to the conference circuit by tie trunks and/or central office trunks, it is usually essential for transmission reasons, at least in the case of PBX conference arrangements, that the number of trunks so connected be held to a minimum. The loss introduced by the connection of a trunk is appreciably greater than that resulting from inclusion of a PBX station line in the conference bridge, and in order to prevent introduction of an intolerable loss it is usually considered necessary to restrict the trunk connections at any one time to one dial-repeating tie trunk and either one ringdown tie trunk or one central office trunk. Heretofore it has been the usual practice in the instance of meet-me type conference arrangements to achieve the restriction of the number of trunk connections by restricting such connections to a specified, limited number of the conference line appearances, the actual connection being made by the PBX attendant upon request of the trunk caller. This practice, of course, results in additional duties on the part of the attendant and reduces the overall efficiency of the circuit due to the fact that only specified line appearances are avaliable for trunk connections.

Accordingly, it is an object of my invention to improve the operation of PBX's.

Another object of my invention is to improve the operation of a meet-me type of conference circuit associated with a PBX.

A more specific object of the invention is to automatically restrict the number of trunk connections to a meet-me type conference bridge.

A still more specific object of the invention is to accomplish the restriction of the number of trunk connections to the conference bridge without restricting such connections to particular line appearances of the conference bridge.

Yet another specific object of my invention is the efficient supply of potential to various points in the conference circuit on the basis of the number of conference line supervisory relays operated at a given moment.

SUMMARY OF THE INVENTION

In accordance with a specific embodiment of my invention a meet-me type conference circuit for use with a crossbar type PBX utilizes a common, multiport transistorized conference amplifier or conference bridge. A plurality of PBX extensions may be connected as conferees together with one dial-repeating tie trunk and either one ringdown tie trunk or one central office trunk. If an additional trunk attempts a connection to the conference bridge, that call is automatically routed to the attendant on an intercept basis as if it were a call to an unassigned number. Potential is supplied to various points in the circuit through a matrix of port supervisory (A–) relay contacts on the basis of the number of A– relays operated, that is "one or more," "one only," and "two or more." Diodes are utilized to isolate the paths whereby the respective potential supply paths may be attained with use of a minimum number of contact combinations.

A feature of my invention is the association of a plurality of diodes with a matrix of relay contacts whereby potential may be selectively supplied to a plurality of different paths through the one matrix of contacts.

Another feature of my invention is means effective when an attempt is made to connect a second trunk call to a conference bridge while a first trunk call is connected thereto to route the second trunk call to the attendant on an intercept basis.

A still further feature of my invention is means for automatically varying characteristics of one confernce line circuit to attain compatibility with either a PBX extension call or a trunk call connected throught the attendant's switchboard.

A full understanding of the arrangement contemplated by the present invention as well as an appreciation of the various advantageous features thereof may be gained from consideration of the following detailed description in connection with the accompanying drawing.

GENERAL DESCRIPTION

Figure 1:
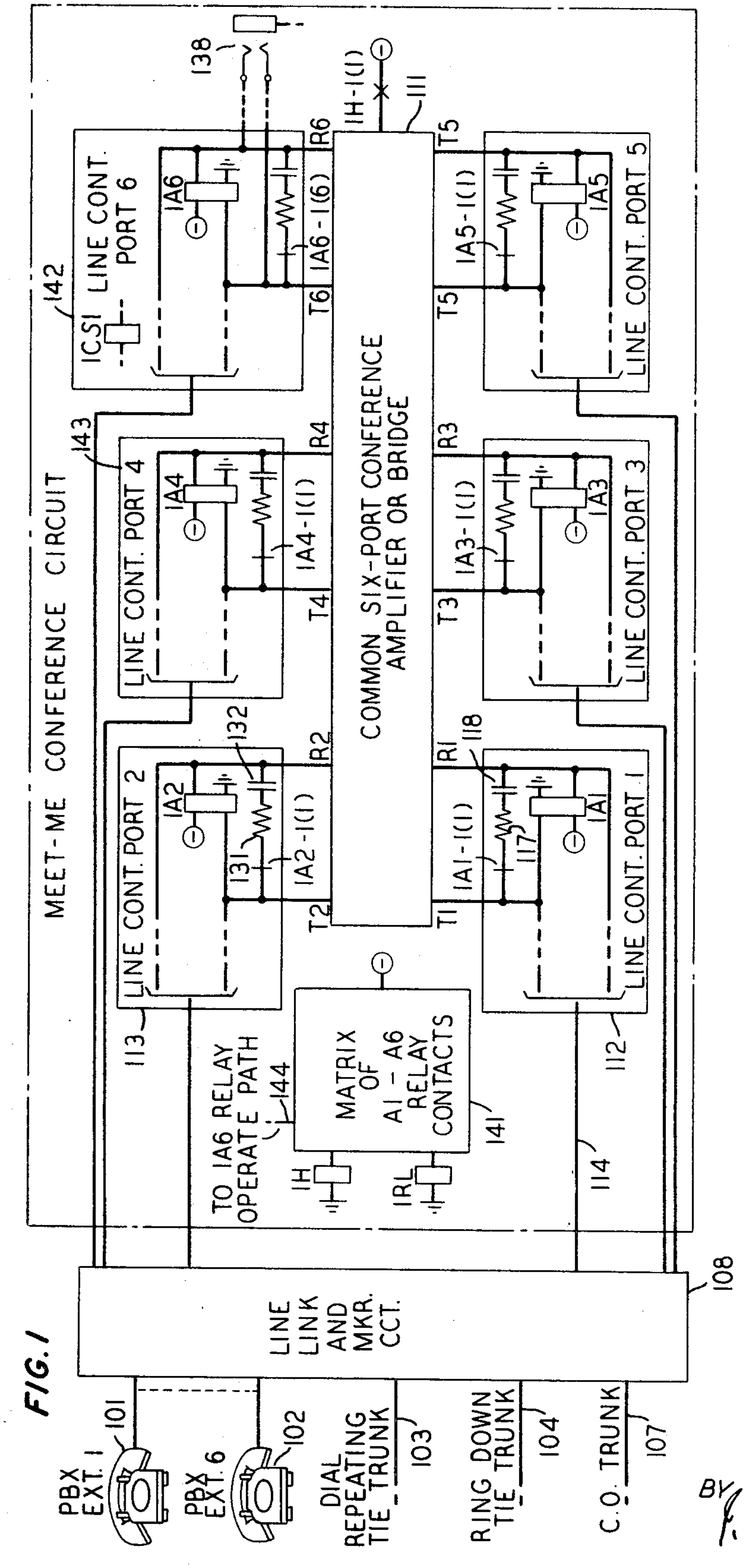
FIG. 1 shows schematically the arrangement and relationship of certain of the basic individual circuits which comprise one specific illustrative embodiment of the PBX conference circuit arrangement contemplated by the invention.
Figure 6:
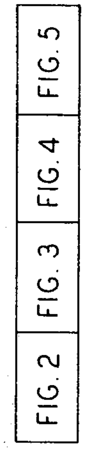
FIG. 6 indicates the manner in which FIGS. 2–5 should be arranged to show the specific illustrative embodiment of the invention.
Figure 2:
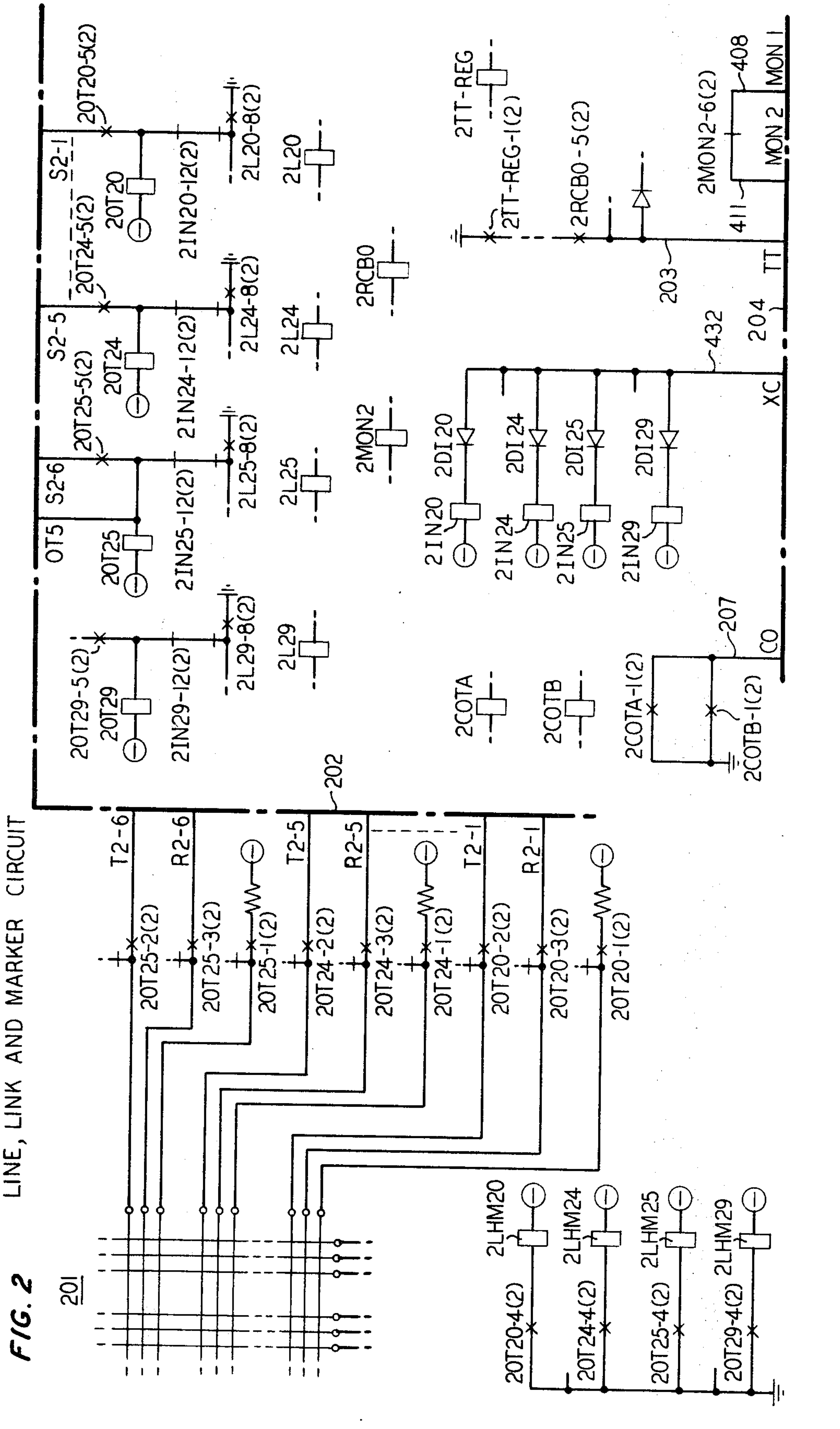
FIG. 2 shows portions of the line, link and marker circuit, in particular the portions of the circuit which have been modified and/or are involved in the operation of the conference circuit.

The arrangement and operation of the various components of the illustrative embodiment of the invention will be described in detail subsequently with reference to FIGS. 2 to 5. However, in order to first gain a general overall understanding of the arrangement contemplated, a brief, general description will be given at this time with reference to FIG. 1. Referring therefore, to FIG. 1, portions of a crossbar PBX are shown in highly schematic form; it will be assumed for purposes of simplified disclosure that the PBX follows the general arrangement described in detail in R. D. Williams Pat. 2,904,637, issued Sept. 15, 1959. The conference circuit contemplated by the present invention is particularly adapted to use in conjunction with the basic switching and controlling circuits full described in the Williams patent and such circuits will be described in the present disclosure only to the extent necessary for full understanding of the present invention.

A PBX of the type referred to ordinarily serves a large number of PBX stations or extensions; for example, in a typical installation from 60 to 70 stations may be served. Extensions 1 (101) to 6 (102) which are shown should be taken merely as representative of all the stations of the PBX. Similarly, dial-repeating tie trunk 103, ringdown tie trunk 104 and central office trunk 107 should be taken as representative of the trunks terminating at the PBX. The PBX extension lines and the respective trunks are associated with the line, link and marker circuit 108 in the normal manner as fully set forth in the Williams patent 2,904,637 referred to above.

Assuming that line circuits are provided at the PBX for a maximum of 60 stations, these lines may be assigned identifying numbers from 20 to 79. Ordinarily, the line circuits for the 20 to 29 group will be made convertible so that they may be used as terminations for tie trunks and miscellaneous special trunks and circuits. When a trunk or special service circuit is connected to a universal line circuit, the assigned number is ordinarily changed from a 20 to 29 number to the corresponding 80 to 89 number, hence the subsequently referred-to reservation of line terminals "80–85" for the conference service.

The conference arrangement utilizes as a common conference amplifier or conference bridge, a 6-port transistorized conference amplifier 111 of the general nature disclosed in A. Feiner Pat. 3,108,157, Oct. 22, 1963. In order to avoid unnecessary complication of the schematic showing in FIG. 1, only the line controlled port connections are indicated; the conference bridge circuit is shown in detail in FIG. 5 and, as just set forth, the overall arrangement and operation are fully disclosed in the Feiner Pat. 3,108,157.

Six line appearances, as selected by the customer, are dedicated to the conference service and one appearance, that is each pair of corresponding switch points, is connected to a respective line controlled port. By way of example, line terminals 80–85 may be reserved for the service in which event these terminals would be connected in a hunting group and the code "80" designated as the conference code. "Two-way" hunting is provided and in the present illustrative embodiment it is assumed that in the event of a call to the hunting group the connection would be made to the "lowest" free terminal of the group. By way of example, the connection would be completed to port 1 (112), if that port is free, to port 2 (113), if port 1 is busy and port 2 is free, and so on until all ports have been engaged. In other embodiments, depending upon the particular marker action, the order of selection might differ.

It will be assumed now that all ports are free at the moment and that extension 101 dials "80" for a connection to the conference bridge. Marker 108, functioning in its normal manner as described in further detail subsequently in connection with FIGS. 2–5, connects the station line of extension 101 through line leads 114 to line controlled port 1, that is the lowest idle port of the hunting group. When this connection has been completed, supervisory relay 1A1 of port 1 operates through the closed loop at extension 101; relay 1A1, operated, removes the idle port termination comprising resistor 117 and capacitor 118 from across the port leads to conference amplifier 111.

Assuming further now that extension 102 dials the conference code "80," that station line will be connected by marker 108 to the next higher port 113, supervisory relay 1A2 of that port will operate, and the idle port termination comprising resistor 131 and capacitor 132 will be removed from across the port connection to conference amplifier 111.

A dial repeating tie trunk, as trunk 103, may obtain a connection to the conference bridge in the same general manner as that just described for an extension connection. A ringdown tie trunk, as trunk 104, or a central office trunk, as trunk 107, may be connected to the conference bridge via a call to the attendant who then completes the connection by dialing the conference code "80." In the event the attendant is using a cord switchboard, she may connect any switchboard jack appearance directly to the conference bridge via a cord connection to jack 138 which is provided at port 6. All of these connections will be described in in detail subsequently with reference to FIGS. 2–5.

For reasons of economic operation, it is desirable that the conference amplifier 111 be energized only when two or more ports are in connected condition; obviously there is no reason to provide potential for talking paths if only one conferee is connected or when no conferees at all are connected. Accordingly, a novel feature of the arrangement contemplated by my invention provides that relay 1H, the potential supply relay, shall operate when, and only when, two or more of the ports are cut through as evidenced by operation of the associated 1A– relays. This is accomplished by passing the operate path of relay 1H through matrix 141 of the supervisory 1A– relay make contacts, the novel arrangement being such that the operate path is closed when, and only when, two or more 1A– relays are operated and the associated contacts in the matrix closed. This is, relay 1H operates over the "two or more" path of matrix 141. When this condition prevails and relay 1H operates, potential is supplied to conference amplifier or bridge 111 through make contact 1H–1(1).

Further, after completion of the conference and the disconnect by the conferees, it is of course desirable to restore the various circuits to normal, and release relay 1RL is provided for this purpose. However, it is desirable that this relay not be operated so long as at least two conferees remain connected to the conference bridge; it should be permitted to operate when only one conferee remains connected. Accordingly, in accordance with the novel arrangement contemplated the operate path of relay 1RL is completed via the "one only" path of matrix 141.

Line controlled port 6 (142) is available for connections established via marker 108 via line 143, and, when the attendant is provided with a cord switchboard, a connection may be made directly to the port via jack 138. In the case of marker-originated connections, the effective configuration of the 1A6 relay with regard to potential supply is the same as that of the 1A– relays of the other ports. However, when a central office trunk or a ringdown tie trunk is connected to the port directly via jack 138 it is desirable for supervision purposes that an "answer" indication be initiated only if, and when, at least one other conferee is connected to the conference bridge in addition to the central office trunk connection just referred to. In accordance with the novel arrangement contemplated by my invention, the normal operate path of the 1A6 relay is so modified in the instance of a jack connected call that the potential for operating relay 1A6 is supplied through matrix 141 via lead 144. This modification in the operate path is initiated, in a manner described in detail subsequently, by operation of relay 1CS1, and, when the modification has been effected, the potential is supplied over the "one or more" path of matrix 141. For a call connected through jack 138, therefore, relay 1A6 will operate, and the "answer" indication will be given, only if, and when, at least one additional conferee is connected to the conference bridge.

It will be apparent from the above and will be further described in connection with FIGS. 2 to 5 that there is provided in matrix 141 a novel arrangement whereby potential is supplied to various points in the circuit in accordance with various conditions of the supervisory 1A– relays, that is, "two or more" operated, "one or more" operated or "only one" operated.

In a novel manner, also to be described in detail subsequently with reference to FIGS. 2–5, at such times as one dial-repeating tie trunk and either one ringdown tie trunk or one central office trunk are connected to the conference bridge, should an additional trunk connection be attempted such call will be automatically routed to the attendant on an intercept basis as a call to an unassigned number.

DETAILED DESCRIPTION

Figure 3:
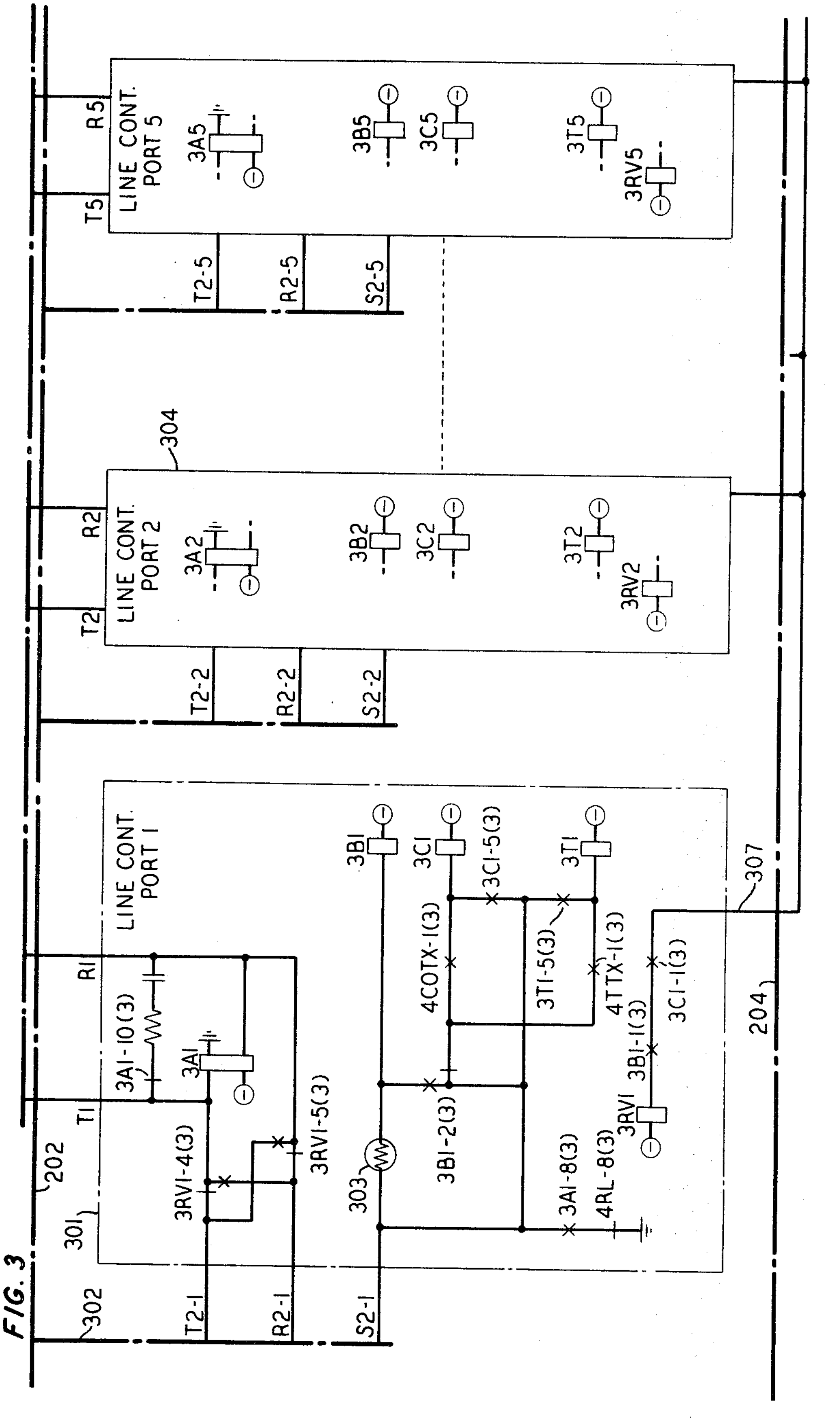
FIG. 3 shows the arrangement of line controlled ports 1-5, the arrangement of port 1 being shown in detail, ports 2 and 5 shown largely as captioned rectangles, and the presence of intervening ports being indicated by dashes.
Figure 4:
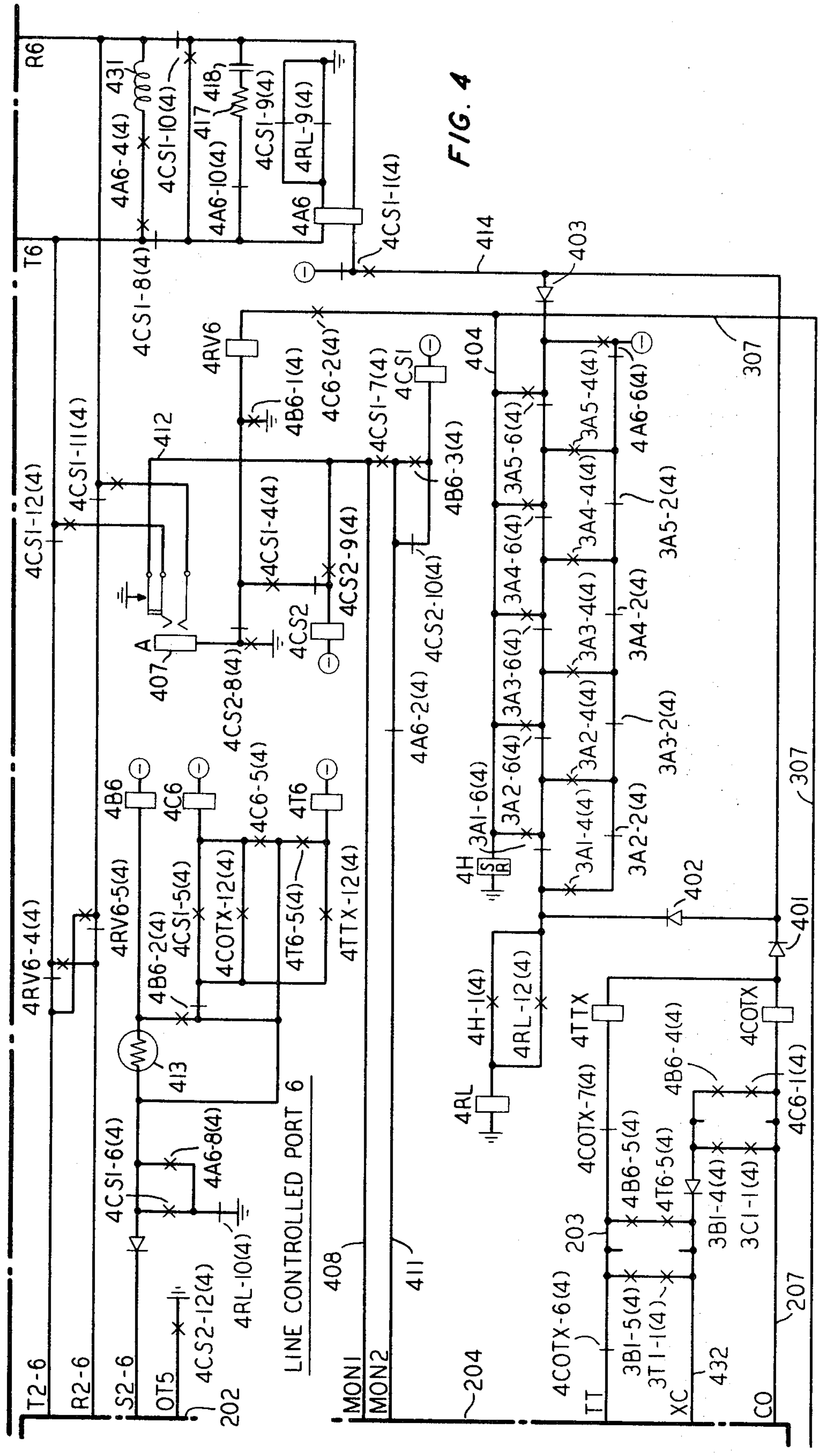
FIG. 4 shows the details of line controlled port 6 as well as the arrangement of the A– relay contact matrix.

The circuits illustrated are arranged in the "detached contact" type of representation wherein, generally speaking, relay contacts, key contacts and the like are shown separated from the relay winding or other means which controls the contacts. This type of disclosure permits functional groups of circuitry to be shown separately thus facilitating an understanding of the operational features embodied in the system. Each designation of a relay winding or the like is preceded by a number indicating the figure of the drawing in which the apparatus in question, for example, the relay winding, appears. An example of this is the designation "3B1" for a relay winding shown in FIG. 3. Further, each contact designation is followed by a numeral in parentheses which indicates the figure of the drawing in which the contact appears. For example, the contact designation 3B1–5(4) indicates that contact No. 5 of relay 3B1 appears in FIG. 4 of the drawing while the relay winding itself, as pointed out above, is shown in FIG. 3.

In accordance with usual circuit design, transfer contact pairs may be either Early Make-Break (Continuity) or Early Break-Make (Sequence Transfer) as dictated by the particular circuit operational requirements.

EXTENSION STATION LINE CONNECTION

It will be assumed first, for purposes of the forthcoming detailed description, that an extension station corresponding, for example, to extension 101 desires to be connected to the conference bridge and accordingly dials the conference code "80." It will be assumed further that lines 20 to 25 have been reserved for the conference ports and have been assigned respective switch terminal numbers 80 through 85. When the extension dials "80" the dial pulse register will recognize this code, due to the presence of the tens digit "8," as equivalent to a tie trunk code and, accordingly, will signal the marker to connect the calling station to the line circuit appearance of the conference circuit designated by the dialed digits 80. Assuming that line controlled port 1, represented generally by rectangle 301, is idle, the marker, functioning in its normal manner, will cause operation of relay 20T20. (It will be understood that line controlled port 1 is the conference appearance corresponding to line 20.)

Figure 5:
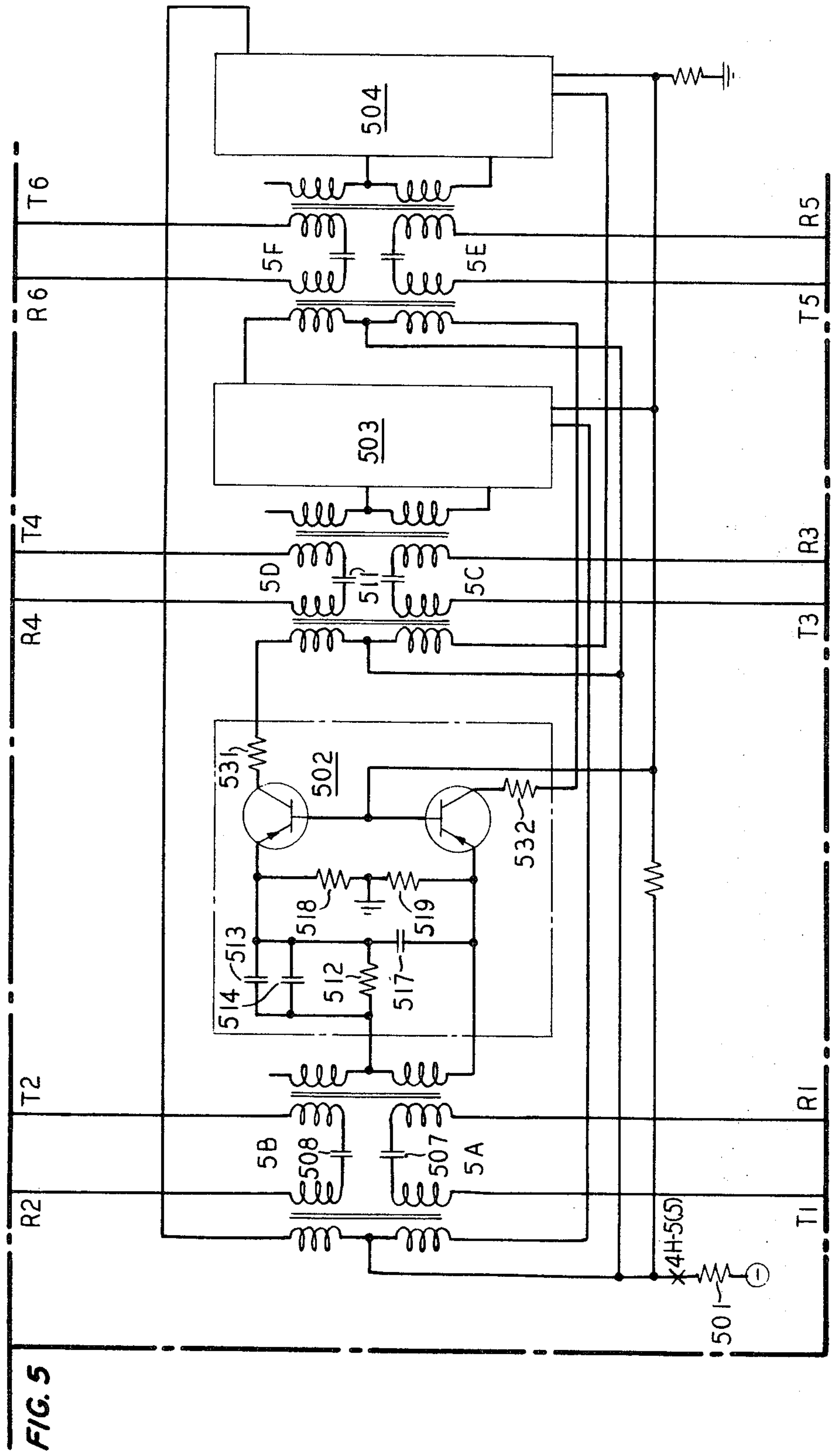
FIG. 5 shows the arrangement of the common, multiport transtorized conference amplifier or conference bridge.

Relay 20T20, operated, closes at make contact 20T20–4(2), an operate path for hold magnet 2LHM20, the hold magnet of switch 201 which is associated with line controlled port 1. With closure of the switch points the station loop is closed through to port 1 via the make contact of transfer pair 20T20–2(2), tip lead T2–1, cables 202 and 302 and via the make contact of transfer pair 20T20–3(2), ring lead R2–1, and cables 202 and 302. Relay 3A1 operates over the closed station loop and removes at break contact 3A1–10(3) the "idle port" termination from across the port leads to the common conference amplifier or conference bridge (FIG. 5). Relay 3A1, operated, also closes an operate path for relay 3B1 from ground, break contact 4RL–8(3), make contact 3A1–8(3), thermistor 303, winding of relay 3B1 to battery. The slow-operate characteristic imparted to relay 3B1 by the inclusion of thermistor 303 in the operate path is not pertinent in the present instance.

Relay 3B1, upon operating, closes a path at the make contact of transfer pair 3B1–2(3) for shunting thermistor 303 out of the operate path whereby to permit the thermistor to cool to its normal ambient temperature. Also, the operate paths of relays 3C1 and 3T1 are opened at the break contact of the same transfer pair, 3B1–2(3), whereby to prevent operation of these relays in the event of a subsequent code "8" or code "9" call.

It will be noted that when only a single conferee is connected to the conference bridge and only one A-relay, in this instance relay 3A1, is operated, a path is not closed through the contact matrix for operating potential supply relay 4H. Accordingly, potential for a talking path is not supplied to the common conference amplifier (FIG. 5) at this time.

It will be assumed now that a second extension, as extension 102, desires to be connected to the conference bridge and dials "80" for the connection. The connection is completed in the general manner just described but in this instance, since port 1 has previously been seized, the connection is closed to the "next" port 2, represented by rectangle 304. Relays 3A2 and 3B2 operate in the same general manner prevailing in the instance of the operation of relays 3A1 and 3B1 previously described. Relay 3A2, operated, removes the idle port termination (not shown) from across the port leads T2 and R2 and the two conferees are now connected to the conference amplifier via transformer windings 5A and 5B.

It will be noted that, with two conferees connected to the conference amplifier and with corresponding port relays 3A1 and 3A2 operated, a path is closed for supplying potential to operate relay 4H; this path is traced from battery, break contact of transfer pair 4A6–6(4), break contacts 3A5–2(4), 3A4–2(4), 3A3–2(4), make contact 3A2–4(4), make contact of transfer pair 3A1–6(4), winding of relay 4H to ground. Relay 4H operates over this "two or more" path of the contact matrix and, upon operating, closes at make contact 4H–5(5) a path for supplying potential through resistor 501 to the conference amplifier. A talking path is now effected for the two connected conferees.

Four additional extensions may be connected to the other four ports in turn in the same general manner described.

DIAL-REPEATING TIE TRUNK CONNECTION

Connection of a dial-repeating tie trunk to the conference bridge is accomplished in a manner generally similar to that prevailing in the instance of an extension connection. In this case, however, during termination of the call by the marker, relay 4TTX is operated in a manner and for a purpose that will be described subsequently.

CENTRAL OFFICE TRUNK OR RINGDOWN TIE TRUNK CONNECTION

A party that calls in via a central office trunk or a ringdown tie trunk may be connected to the conference bridge through attendant operation. Also, the attendant may dial-up a distant party via a central office trunk or ringdown tie trunk and connect the party to the conference bridge. In either case the attendant connection may be made through an attendant's console or by way of a cord switchboard. The respective connections are completed as follows.

CONNECTION THROUGH CONSOLE

The attendant momentarily depresses the hold key on her console and, upon receiving dial tone, she dials the "80" conference code. When the marker terminates the call, ground is applied to lead 207, (CO) through make contacts 2COTA–1(2) and 2COTB–1(2) of operated marker relays 2COTA and 2COTB. Relay 4COTX operates from this ground as battery is applied through the relay contact matrix. This potential is applied through diode 401 and through either diode 402 or diode 403 depending upon the number of ports and which ports are already occupied with the corresponding A– relays operated. Assuming, first, that only port 1 is occupied and that supervisory relay 3A1 is the only one of the A– relays which is operated at the moment, potential is supplied through the break contact of transfer pair 4A6–6(4), break contacts 3A5–2(4), 3A4–2(4), 3A3–2(4), 3A2–2(4), make contact 3A1–4(4), diodes 402 and 401 to relay 4COTX. On the other hand if ports 3 and 4 are occupied and relays 3A3 and 3A4 operated, potential will then be supplied through the break contact of transfer pair 4A6–6(4), break contact 3A5–2(4), make contact 3A4–4(4), make contack of transfer pair 3A3–6(4), make contact of transfer pair 3A4–6(4), break contact of transfer pair 3A5–6(4), diodes 403 and 401 to relay 4COTX.

Marker termination of the call also operates the marker relay 20T2– corresponding to the next idle port; assuming that the call is completed to port 5, relay 20T25 will operate which will be followed by operation of relay 3A5. Operation of relay 3A5 is followed by operation of relay 3C5. Since the relay paths of port 5 are not shown in detail in order to avoid undue complexity of the drawing it will be assumed for purposes of immediate description that the relay paths of port 1 are involved (since such circuits of ports 1 and 5 are identical) and that relay 3A1 has operated. Relay 3A1, operated, closes a path for operating relay 3C1 from ground, break contact 4RL–8(3), make contact 3A1–8(3), break contact of transfer pair 3B1–2(3), make contact 4COTX–1(3), winding of relay 3C1 to battery; relay 3A1, operated, also closes an operate path for relay 3B1 through thermistor 303. Relay 3B1 is given a slow-operate characteristic by inclusion of thermistor 303 in the operate path in order in this instance that relay 3C1 (or 3T1) may operate and lock operated before relay 3B1 operates and interrupts the operate path at transfer contact 3B1–2(3).

Relay 3B1, operated, shunts thermistor 303 and allows it to restore to normal ambient temperature. Also, relay 3B1, operated, interrupts the operate paths of relays 3C1 and 3T1 at the break contact of transfer pair 3B1–2(3). In this instance, however, relay 3C1 had previously operated as described above and remains locked to ground through its make contact 3C1–5(3), make contact 3A1–8(3) and break contact 4RL–8(3). Accordingly, the operate path of relay 3RV1 is now closed at make contacts 3C1–1(3) and 3B1–1(3). Relay 3RV1, and the RV– relays associated with the other ports, are "reverse battery" relays and, when operated, return reverse battery supervision to the trunk circuit to indicate "call answer." It is desirable that this indication not be returned unless, and until, at least one other conferee is connected to the conference bridge in addition to the trunk connection just completed. Accordingly, the operating potential for relay 3RV1, and similarly for the other RV– relays, is obtained from a "two or more" path in the contact matrix over "two or more" lead 307. For example, it will be assumed in the present instance that ports 6 and 1 are occupied in which case operating potential for relay 3RV1 will be applied through the make contact of transfer pair 4A6–6(4), respective breakcontacts of transfer pairs 3A5–6(4), 3A4–6(4), 3A3–6(4) and 3A2–6(4), make contact of transfer pair 3A1–6(4), lead 404 to lead 307.

The reverse battery supervision in the trunk circuit operates a polarized relay in the trunk circuit and the trunk lamp is lighted "steady." The attendant may then release and the trunk call remains connected to the conference bridge. It is not actually necessary that the attendant remain connected to the central office trunk until another party joins the conference. Actually, the attendant may release immediately after completing the connection; if no one else has joined the conference as yet the trunk lamp will "flash" to indicate ringing and will go to "steady" when another party joints the conference.

CONNECTION THROUGH CORD SWITCHBOARD

In those cases where the attendant is provided with a cord switchboard, she may connect any trunk appearance at the switchboard by a cord connection to the single meet-me conference jack 407 which is provided and through which a direct connection may be obtained to conference port 6. It will be understood that port 6 is available to marker connected calls in the same manner as the other five ports and it cannot of course be seized by the attendant if already engaged on a marker initiated connection.

It will be observed that when the circuit is in normal condition, in particular when relay 4CS1 is nonoperated, that the general arrangement of relay 4A6 with regard to the potential supply paths via tip and ring is the same as that of the other port relays 3A1–3A5.

Assuming now that port 6 is available for a connection and that the attendant plugs-in to jack 407, relay 4CS1 will operate from the switchboard frame ground, sleeve lead 412, MON1 lead 408, cable 204, break contact 2MON2–6(2), MON2 lead 411, cable 204, break contacts 4A6–2(4) and 4CS2–10(4), winding of relay 4CS1 to battery. Had the port actually been busy on a prior connection when the attendant plugged-in, relay 4A6 would be operated and the operate path for relay 4CS1 would have been interrupted at break contact 4A6–2(4).

Relay 4CS1, operated, closes at make contact 4CS1–6(4) a path for operating relay 4C6 through the break contact of transfer pair 4B6–2(4), and a path through thermistor 413 for operating relay 4B6. Because of the slow-operate characteristic imparted to relay 4B6 by the inclusion of thermistor 413 in the operate path, sufficient time is assured for relay 4C6 to operate and lock through its make contact 4C6–5(4) before the operate path is interrupted at the break contact of transfer pair 4B6–2(4). Also, relay 4CS1, operated, interrupts at the break contacts of transfer pairs 4CS1–12(4) and 4CS1–11(4) the path to the marker controlled line and connects at the make contacts of the same transfer pairs the tip and ring of jack 407 to the tip and ring of port 6.

Relay 4B6, operated, shunts thermistor 413, whereby to permit its return to normal ambient temperature, and closes at make contact 4B6–1(4) a path for operating relay 4CS2 through make contact 4CS1–4(4) and the break contact of transfer pair 4CS2–9(4); relay 4CS2 operates and locks through the make contact of transfer pair 4CS2–9(4) to the frame ground on sleeve lead 412.

With relays 4B6 and 4C6 operated, reverse supervision relay 4RV6 is connected to "two or more" path 307 and, in the event two or more A– relays are operated, relay 4RV6 will operate at this time in a manner similar to that previously described in reference to relay 3RV1. In the event less than two A– relays are operated, the operation of relay 4RV6 is delayed until such time as the "two or more" path is closed. Should the 4RV6 relay operate at this point it serves no useful purpose at the moment.

Relay 4CS2, operated, closes a path at the make contact of transfer pair 4CS2–8(4) for connecting ground to the sleeve of switchboard jack 407; this causes the associated switchboard supervisory lamp (not shown) to flash until the loop to the switchboard is closed following operation of relay 4A6. Also, ground is applied through make contact 4CS2–12(4) to lead 0T5 whereby to operate relay 20T25 and "busy" the associated line circuit.

It will be observed that with operation of relay 4CS1 the normal potential supply to the lower winding of relay 4A6 is interrupted at the break contact of transfer pair 4CS1–1(4) and a connection is made through the make contact of the same transfer paid to lead 414. As in instances previously described above, it is desirable in this case that "answer indication" not be given until at least one other conferee be connected to the conference bridge in addition to the trunk connection via switchboard jack 407. Accordingly, the change in potential supply just referred to is instituted in accordance with the novel arrangement contemplated by the invention whereby, in the instance of a connection completed via jack 407, operating potential for relay 4A6 is supplied over "one or more" lead 414. For example, assuming that a conferee has previously been connected to port 5 and that port relay 3A5 is operated, potential will be supplied through break contact of transfer pair 4A6–6(4), make contact 3A5–4(4), break contacts of transfer pairs 3A4–6(4), 3A3–6(4), 3A2–6(4), and 3A1–6(4), diode 402, lead 414, make contact of transfer pair 4CS1–1(4), lower winding of relay 4A6, make contact of transfer pair 4CS1–10(4), upper winding of relay 4A6, break contact 4RL–9(4) to ground; relay 4A6 operates over this path.

Relay 4A6, operated, removes at break contact 4A6–10(4), the idle port termination, resistor 417 and capacitor 418, from across the conference bridge connection and closes at make contact 4A6–4(4) a direct current path through inductance 431 across the line conductors.

In the above instance had both ports 5 and 4 been occupied and relays 3A5 and 3A4 operated, the potential for operating relay 4A6 would then have been supplied through the break contact of transfer pair 4A6–6(4), make contact 3A5–4(4), make contact of transfer pair 3A4–6(4), make contact of transfer pair 3A5–6(4), diode 403 to lead 414.

It will be understood that port 6, when idle, is available in the normal manner for a marker initiated connection since relay 4CS1 will be in normal, released condition, the line will be connected through to the port leads at the break contacts of transfer pairs 4CS1–12(4) and 4CS1–11(4), the tip and ring port leads will be closed through at the break contacts of transfer pairs 4CS1–8(4) and 4CS1–10(4), and the normal potential supply will be applied through the break contact or transfer pair 4CS1–1(4). The novel manner in which relay 4CS1, operating upon plug-in to jack 407, is utilized to change the effective configuration of port 6 from that for a marker initiated connection to that advantageously serving a switchboard connected call will be readily apparent.

In the instance of a cord connected call it may happen that the attendant will fail to remove the plug from jack 407 promptly upon receiving "Take Down" supervision when the next-to-last conferee disconnects from the conference bridge. In such case the cord connected conferee would find himself a party to a new conference should such a conference be set up before removal of the plug. Such an undesired result is prevented by the novel arrangement of the present invention, however, since relay 4CS2 is held operated, so long as the call remains plugged in, by the connection via the make contact of transfer pair 4CS2–9(4) to lead 412 and the ground at the operated jack. Reoperation of relay 4CS1 is prevented, therefore, as the operate path is open at break contact 4CS2–10(4) and the connection of the cord connected conferee to port 6 is held open at the break contacts of respective transfer pairs 4CS1–12(4) and 4CS1–11(4). Port 6 is available to marker-initiated connections however via the break contacts of the same transfer pairs. When the attendant does take down the connection, relay 4CS2 releases and the circuit is then in normal operating condition.

COMPLETION OF CONFERENCES CONNECTIONS

After conferees have been connected to all six ports of the common conference bridge (FIG. 5) mutual conversations may, of course, take place.

As pointed out above, the conference amplifier or bridge (FIG. 5) follows the general design set forth in A. Feiner Pat. 3,108,157, Oct. 22, 1963, and will be described only in general terms herein. The conference amplifier includes three two-coil hybrid circuits with associated single-stage grounded base transistor amplifiers, one of which, 502, is shown in detail and the other two of which, 503 and 504, are represented by rectangles. Each outlet or port (as 5A, 5B, etc.) is provided with a capacitor, as 507, 508, 511.

The secondary of the low impedance transformer associated with ports 1 and 2 (5A and 5B) is connected to the emitters of the transistors of amplifier 502 through an R-C network comprising resistor 512 connected in parallel with capacitors 513 and 514. The purpose of capacitors 513 and 514 is to couple the alternating-current signal to the transistor emitters and at the same time prevent direct-current flow from emitter to emitter due to forward junction voltage differences. Resistor 512 is effective to damp any possible resonance resulting from use of the capacitors in conjunction with the transformer secondary and yet maintain a relatively high direct-current resistance from emitter to emitter. Capacitor 517 is provided to enhance stability while resistors 518 and 519 in conjunction with the bias network voltage set the quiescent current through the two transistors and so determine overload characteristics. Resistors 531 and 532 limit the current flow through the transistor collectors in the event of possible interference or excess voltage conditions. Coupling networks similar to that described above are provided in conjunction with the other two amplifiers 503 and 504.

In general, operation of the conference amplifier or conference bridge is based upon the concept of unbalanced hybrid coils with intercoupled common-base transistor amplifiers. The grounded base transistor provides a nearly unity current amplification and has a very low input impedance and a very high output impedance. This difference serves to unbalance the hybrids sufficiently that transmission between the respective outlets or ports is practically without loss.

PREVENTION OF SECOND TRUNK CONNECTION

As pointed out above, it is desirable for transmission reasons that the number of trunks connected to the conference bridge be limited and, as further pointed out, the novel arrangement contemplated by my invention is such that connections are automatically restricted to a maximum of one central office trunk or one ring-down tie-trunk and a maximum of one dial-repeating tie trunk. Should more than this permissible number of trunk calls be attempted, the "extra" call is automatically routed to the attendant on an intercept basis.

It will be assumed that a dial-repeating tie trunk is already connected to port 1. As described above, connection of a dial-repeating tie trunk is similar to that of the PBX extension except that during termination of the call by the marker, register relay 2TT–Reg operates and closes a path to operate relay 4TTX. Relay 4TTX, operated, closes at make contact 4TTX–1(3) a path over which relay 3T1 operates before the operation of relay 3B1; relay 3T1 upon operation locks to ground through its make contact 3T1–5(3). Relay 3B1 operates following a delay interval due to inclusion of thermistor 303 in the operate path.

Now assuming that a second dial-repeating tie trunk attempts to obtain a connection to the conference bridge, the register signals the marker to terminate the call, relays 2TT-Reg and 2RCBO being operated. Ground is now applied to TT lead, through make contact 2RCBO–5(2), cable 204, break control 4COTX–6(4), make contacts 3B1–5(4) and 3TI–1(4), XC lead 432, cable 204, through respective diodes 2DI20–2DI29 and operate windings of relay 2IN20–2IN29; the six relays 2IN20–2IN29 operate over this path (one 2IN– relay is associated with each of the six conference port lines).

Operation of the 2IN– relays at this point opens the "A" lead from the marker to the respective 20T– relays. For example the marker lead to relay 20T20 is open at break contact 2IN20–12(2); the lead to relay 20T24 is open at break contact 2IN24–12(2); and the lead to relay 20T29 is open at break contact 2IN29–12(2).

In accordance with normal marker operation, when no ground is found on a respective lead it is taken as an indication of an unassigned line and the attempted call is intercepted and routed to the attendant. In the present case when the marker finds an open on the respective lead due to operation of the 2IN– relays, the marker treats the call as one directed to an unassigned number and routes the attempted call to the attendant.

An attempted second call by a central office trunk when a trunk call is already connected to the conference bridge is intercepted in the same general manner as that just described with reference to a second tie trunk attempted connection.

CONFERENCE RELEASE

Different release functions occur depending upon whether at least two other conferees remain connected after the party in question releases.

Assuming first that the party connected to port 1 releases while at least two other conferees remain connected, hang-up by the party and interruption of the station loop releases relay 3A1. Relay 3A1, released, releases relays 3B1 and 20T20 by interrupting the respective holding paths at make contact 3A1–8(3).

Relays 3A1, 3B1 and 20T20, released, restore port 1 to normal idle condition.

Assuming now that when the conferee connected to port 2 releases, only one conferee remains connected, the remaining connection being to port 1. Relays 3A2, 3B2 and the associated 20T– relay release together with the associated line hold magnet.

It will be recalled that potential supply relay 4H is energized over a "two or more" path through the matrix of A– relay contacts and, since we now have only relay 3A1 operated, the energizing path of relay 4H is interrupted and the relay starts to release. (Relay 4H has a slow-release characteristic.) Release relay 4RL, as previously pointed out, operates over a "one only" path of the matrix and in this instance operating potential is supplied through break contact of transfer pair 4A6–6(4), break contacts 3A5–2(4), 3A4–2(4), 3A3–2(4), 3A2–2(4), make contact 3A1–4(4), make contact 4H–1(4), relay 4H not yet being fully released, winding of relay 4RL to ground; relay 4RL upon operating locks to the same potential path through its make contact 4RL–12(4).

Relay 3A2, released, also releases relay 3T2 or 3C2, if operated as well as relay 3RV2 if operated.

Relay 4RL, operated, releases relay 3B1, as well as relays 3C1 or 3T1 if operated, by interrupting the operate path at break contact 4RL–8(3) and the associated 20T– relay is also released by removal of the potential from the respective S– lead.

Release of the respective 20T– relay opens the loop to operated relay 3A1 and that relay releases. Relay 3A1, released, releases relay 4RL by interrupting the hold path at make contact 3A1–4(4). When relay 4H has fully released energizing potential is removed from the conference amplifier at make contact 4H–5(5). The circuit is now restored to normal condition.

It will be clear from the preceding description that the provision of the novel matrix arrangement of make contacts of the Supervisory relays of the respective conferee line ports permits the efficient supply of potential to various points of the conference bridge on the basis of the number of conferees connected at the moment, this being evidenced by the number of port supervisory relays operated. Thus, since it is desirable to energize the common conference amplifier when, and only when, two or more conferees are connected, the potential supply relay, 4H, is operated over the "two or more" path of the matrix. Also, since it is desirable under certain circumstances to initiate "answer supervision" only when at least two conferees are connected, the 3RV– and 4RV6 answer supervision relays are also operated over the "two or more" path. With regard to conference release on the other hand, this should occur only when but a single conferee remains connected. Accordingly, the release relay 4RL is operated via a "one only" path through the contact matrix. Further, with regard to connection of a trunk call directly to port 6 via the cord switchboard, it is desirable that the supervisory relay of that port be operated and answer supervision be transmitted only if at least one other conferee is already connected. Accordingly, under this condition the operate path of the relay is temporarily modified whereby the operate potential is obtained via a "one or more" path of the contact matrix.

Diodes are strategetically associated with the respective paths for purposes of path isolation whereby to permit taking the different paths off the same contact array. This is true particularly of diodes 402 and 403. Diode 401 isolates the "one or more" operate path of relay 4A6 whereby to prevent possible premature operation of the relay by battery on XC lead 432, make contacts 3B1–4 and 3C1–1(4) and through winding of relay 4COTX.

While certain specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone system, a private branch exchange having a plurality of conferee lines, a conference circuit included in said private branch exchange, a common conference bridge included in said conference circuit, said conference bridge including a plurality of conferee connecting ports, a supervisory relay associated with each of said ports, means for connecting said conferee lines to idle ones of said ports in turn and for operating the associated supervisory relay as a conferee line is connected to a respective one of said ports, a power supply for said conference bridge, and means effective only when conferee lines are connected to at least two of said ports for supplying potential to the conference bridge from said operating power source.

2. In a telephone system, the combination defined by claim 1 further characterized in a potential supply relay included in said potential supplying means, a matrix of contacts of said respective supervisory relays, and an operate path for said potential supply relay including contacts of said matrix so selected that the path is closed only when two or more of said supervisory relays are operated.

3. In a telephone system, the combination defined by claim 2 further characterized in release means for said conference circuit, and means for energizing said release means only when but a single conferee line remains connected to the conference bridge.

4. In a telephone system, the combination defined by claim 3 further characterized in a release relay included in said release means and an operate path for said release relay including contacts of said matrix so selected that said operate path is closed only when but a single port supervisory relay is operated.

5. In a telephone system, a private branch exchange, a conference circuit included in said private branch exchange, a common conference bridge included in said conference circuit, said conference bridge including a plurality of conferee connecting ports, a supervisory relay associated with each of said ports, means for connecting conferee lines to idle ones of said ports in turn and for operating the associated supervisory relay as each of said lines is connected to a respective one of said ports, an attendant position, means for connecting a trunk from said attendant position to a predetermined one of said conferee connecting ports, a power source for said conference bridge, means effective when at least two conferee lines are connected to said conference bridge for connecting said power source to said bridge, means effective when only one conferee line remains connected to said conference bridge for disconnecting said power source from said bridge, said disconnecting means being prepared for operation by said connecting means, said connecting means and said disconnecting means each including respective path through a matrix of contacts of all of said supervisory relays, and an additional path through said matrix for connecting said power source to the supervisory relay of said predetermined conferee port for said trunk, said additional path energizing said trunk port supervisory relay only when at least one other of said supervisory relays is energized, and a plurality of diodes for isolating said additional path from said connecting and said disconnecting paths.

6. In a telephone system a private branch exchange, a conference circuit included in said private branch exchange, a common conference bridge included in said conference circuit, said conference bridge including a plurality of conferee connecting ports, a supervisory relay associated with each of said ports, a potential supply for said supervisory relays, marker-controlled means for connecting conferee lines to idle ones of said ports in turn and for operating the associated supervisory relay as a line is connected to a respective one of said ports, additional connecting means associated with one of said ports whereby a conferee line may be connected directly to said one port from a cord switchboard, an additional potential supply path for the supervisory relay associated with said one port, a matrix of contacts of said supervisory relays and means for including, in said additional potential path, contacts of said matrix so selected that the path is closed when at least one other of said supervisory relays is operated.

7. In a telephone system the combination defined by claim 6 further characterized in a plurality of diodes associated with said potential path and a further potential path, a first and a second of said diodes being so poled as to permit flow of current in said additional potential path to said supervisory relay associated with said one part, and a third of said diodes being so poled as to prevent flow of current in said further potential path to said last-mentioned supervisory relay.

8. In a telephone system, a private branch exchange, an attendant's circuit, a conference circuit, a common conference bridge included in said conference circuit, said conference bridge including a plurality of conferee connecting ports, a plurality of conferee lines of two different classes, means for connecting said conferee lines of different classes to idle ones of said ports in turn, the first class including extensions of the private branch exchange and the second class including trunks, and means effective when a predetermined, permissible number of calls of said second class are connected to the conference bridge for automatically routing additional attempted calls of said second class to said attendant's circuit.

9. In a telephone system, a circuit, a plurality of supervisory relays included in said circuit, means for selectively operating said supervisory relays, a potential source, and a means for supplying potential from said source to a first point in said circuit when one or more of said supervisory relays are operated, for supplying potential from said source to a second point in said circuit when two or more of said supervisory relays are operated, and for supplying potential from said source to a third point in said circuit when only one of said supervisory relays is operated, said means for supplying potential including a plurality of supply paths, a matrix of contacts of said supervisory relays included in said paths and a plurality of diodes also included in said paths and electrically isolating one of said paths from another.

10. In a telephone system, a private branch exchange, a conference circuit included in said private branch exchange, a common conference bridge included in said conference circuit, said conference bridge including a plurality of conferee connecting ports for conferee lines, said conferee lines including trunks, an attendant position as part of said private branch exchange, means for connecting a trunk from said attendant position to a predetermined one of said conferee connecting ports, a supervisory relay associated with each of said ports, means for connecting conferee lines to idle ones of said ports in turn and for operating the associated supervisory relay as each of said lines is connected to a respective one of said ports, a power source for said conference bridge, means effective when at least two conferee lines are connected to said conference bridge for connecting said power source to said bridge, means effective when only one conferee line remains connected to said conference bridge for disconnecting said power source from said bridge, said disconnecting means being prepared for operation by said connecting means, registration means for registering the types of said trunks connected to the conference bridge, means effective when at least one other conferee is connected to said conference bridge to apply said power source to said registration means, means effective when only one conferee remains connected to said conference bridge for disconnecting said power source from said registration means, call answer means associated with each port operable when a trunk is connected to a respective one of said ports, means effective when at least one other conferee is connected to said conference bridge to apply said power source to said call answer means, means effective when only one conferee remains connected to said conference bridge for disconnecting said power source from said call answer means, said connecting means and said disconnecting means for connecting said power source to said conference bridge, said registration means and said call answer means each including respective paths through a matrix of contacts of all of said supervisory relays, alternate means for connecting said potential source to the supervisory relay of said predetermined port when a trunk is connected to said predetermined port directly from said attendant position, said alternate means having an additional path through said matrix from said power source to said predetermined port supervisory relay when at least one other supervisory relay is operated, and a plurality of diodes for isolating said alternate path from said first-named paths for supplying power to said conference bridge, said registration means, and said call answer means.

References Cited

UNITED STATES PATENTS 3,322,901 5/1967 Trimmer ............ 179—27

WILLIAM C. COOPER, Primary Examiner

A. B. KIMBAU, Jr., Assistant Examiner

U.S. Cl. X.R.

179—27